Jan. 21, 1969  H. LINK ETAL  3,422,846
CONTROL ARRANGEMENT FOR AUTOMATIC MACHINE TOOLS
Filed Dec. 19, 1966  Sheet 1 of 3

Inventors
Helmut Link
Erich Schäfer
by Michael S. Striker
Attorney

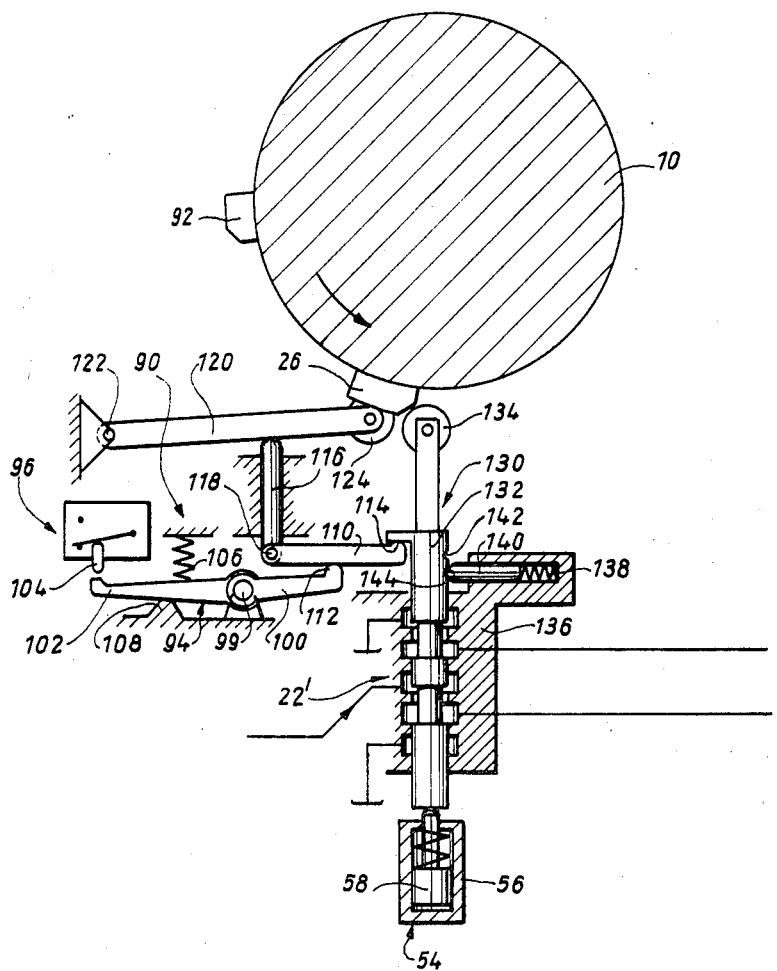

United States Patent Office 3,422,846
Patented Jan. 21, 1969

3,422,846
CONTROL ARRANGEMENT FOR AUTOMATIC MACHINE TOOLS
Helmut Link, Esslingen-Lerchenaecker, and Erich Schaefer, Stuttgart-Oberturkheim, Germany, assignors to Index-Werke K.G. Hahn & Tessky, Esslingen (Neckar), Germany
Filed Dec. 19, 1966, Ser. No. 602,923
Claims priority, application Germany, Dec. 21, 1965, J 29,665
U.S. Cl. 137—624.18                       18 Claims
Int. Cl. F16k 31/04; F15b 13/07

ABSTRACT OF THE DISCLOSURE

Control arrangement for hydraulically operated feed mechanisms in machine tools wherein the flow of hydraulic fluid to and from the cylinders of two or more hydraulic feed mechanisms is regulated by control valves actuated by cams on a camshaft. To prevent premature movements of feed mechanisms to and from their operative and retracted positions, the camshaft is arrested when a feed mechanism leaves its retracted position and is started again in response to return movement or in response to completed return of such feed mechanism to retracted position. The camshaft carries two sets of cams. The cams of one set act upon the control valves and the cams of the other set arrest the drive for the camshaft upon completed actuation of a control valve in a sense to effect movement of a feed mechanism to operative position.

Background of the invention

The present invention relates to a control arrangement for automatic machine tools, particularly for regulating the forward traverse, feed, and return traverse strokes of hydraulically operated tool holders in automatic bar machines or the like wherein two or more material removing tools are caused to move seriatim into and away from actual engagement with a workpiece.

In many automatic machine tools, the working station is very crowded, especially if the machine tool comprises a single work holder and if each workpiece must be treated by a large number of tools. For example, many machine tools comprise a rotary work spindle and a series of hydraulically operated tool slides which are movable radially toward and away from the work spindle and whose operation is controlled by a continuously driven camshaft. The cams on the camshaft actuate control valves which regulate the flow of hydraulic fluid to the cylinders of feed mechanisms for individual tool slides. Such control arrangements operate satisfactorily if the viscosity of hydraulic fluid remains unchanged. However, if the temperature of hydraulic fluid drops, the speed of fluid flow to and from the cylinders decreases and it can happen that a tool is still in actual engagement with the workpiece when the next tool begins its feed stroke. If the working station is very crowded, this may cause the tools or their slides to interfere with each other whereby the tools can break and the entire control arrangement suffers damage which might cause lengthy interruptions in the machining operation.

Attempts to avoid clashing of tools and/or their slides at the working station include the provision of metering or flow regulating valves which determine the speed of traverse and feed strokes; however, such valves are reliable only if the viscosity of hydraulic fluid remains within a certain optimum range. It was also proposed to use a camshaft which rotates at such a low speed that a first tool invariably leaves the working station before the next tool begins its forward traverse and feed strokes. Such operation reduces the output of the machine tool because the intervals between successive machining steps are too long.

Changes in viscosity of hydraulic fluid can also interfere with proper feed of workpieces, for example, if the feed for a bar which is fed internally through a work spindle is started prior to completion of the last machining operation on the preceding workpiece, i.e., if the workpiece is not as yet separated from the bar when the latter moves axially to place the next increment into requisite position with reference to the tools. Furthermore, presently known control arrangements for the tool slides of automatic machine tools must be constructed and adjusted with utmost precision and the speed of the camshaft must be changed at frequent intervals.

It is an important object of our invention to provide a novel and improved control arrangement which invariably prevents interference between the tools and/or hydraulically operated tool holders of an automatic machine tool and whose operation is independent of the viscosity of hydraulic fluid which is used to effect traverse and feed movements of tools.

Another object of the invention is to provide the control arrangement with a safety feature which insures that all but one tool holder will invariably remain in retracted position and that a tool holder can move its tool into engagement with a workpiece only when the preceding tool holder moves toward or reassumes its retracted position.

A further object of the invention is to provide a novel operative connection between the control valves which regulate the flow of hydraulic fluid to the cylinders of feed mechanisms for tool holders and the drive for the camshaft of the above outlined control arrangement.

An additional object of the invention is to provide novel control valves which may be used in the improved control arrangement.

Still another object of the instant invention is to provide a control arrangement which can be built into presently known machine tools by necessitating only minor changes in the design and/or operation of such machine tools.

A further object of the invention is to provide a control arrangement which occupies little room, which utilizes a relatively simple and inexpensive drive for the camshaft, and wherein the cams on the camshaft need not be adjusted with utmost precision without risking any damage to the tools and/or their holders.

Another object of the invention is to provide a control arrangement whose operation is fully automatic and which can be used in connection with machine tools having two, three, four or more feed mechanisms.

Summary of the invention

The invention is embodied in a control arrangement which is particularly suited to regulate the operation of plural hydraulic feed mechanisms in automatic machine tools. The control arrangement comprises a rotary camshaft provided with a plurality of circumferentially staggered control cams, drive means operative to rotate the camshaft, a plurality of control valves each actuatable by one of the control cams to move from a first to a second position, reversing units for returning the control valves to first position with a delay following movement to second position, and arresting means for interrupting the operation of the drive means on movement of a control valve to second position so that the camshaft is brought to a standstill whenever a control valve leaves its first position and until the respective reversing unit returns the control valve to first position.

The arresting means preferably comprises a set of second cams provided on the camshaft and alternating with the control cams, actuating means operatively connected with the drive means and movable between first and second positions which respectively correspond to idle and operative conditions of the drive means, and a separate motion transmitting unit for each control valve. Each motion transmitting unit is arranged to move the actuating means to first position in response to engagement with one of the second cams. Thus, when a control valve is engaged by the corresponding control cam and moves to second position, the camshaft continues to rotate until the nearest second cam engages the associated motion transmitting unit which causes the actuating means to arrest the drive means and to hold the camshaft against rotation. The actuating means is caused to move to second position and to initiate the operation of drive means when the respective reversing unit returns the control valve to first position whereby the camshaft rotates and moves the next-following control cam into engagement with the corresponding control valve.

Each control valve can regulate the flow of hydraulic fluid to the cylinder of a hydraulic feed mechanism and the reversing units are arranged to initiate the return traverse movement of the respective feed mechanisms by moving the associated control valves back to first position. Thus, the camshaft is automatically held against rotation until a feed mechanism at least begins its return stroke so that the next-following feed mechanism cannot interfere with movement of the preceding feed mechanism or vice versa.

*Short description of the drawing*

FIG. 3 is a fragmentary transverse sectional view of a modified control arrangement.

*Description of the preferred embodiments*

Figure 1:
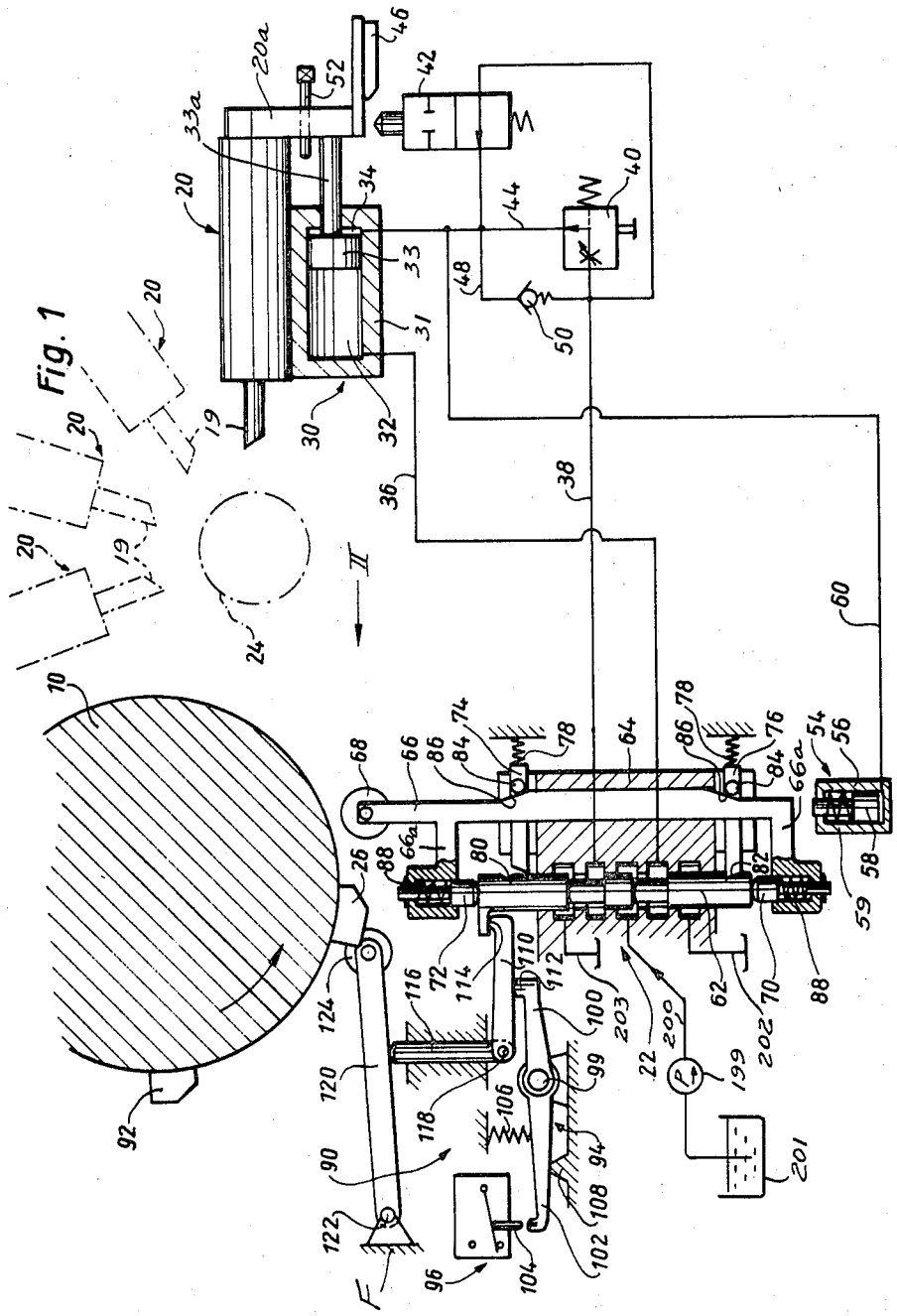
FIG. 1 is a transverse vertical section through a machine tool with a single work spindle and four tool holders, further showing one of the control valves in a position in which the corresponding tool holder is caused to perform a return traverse stroke.
Figure 2:
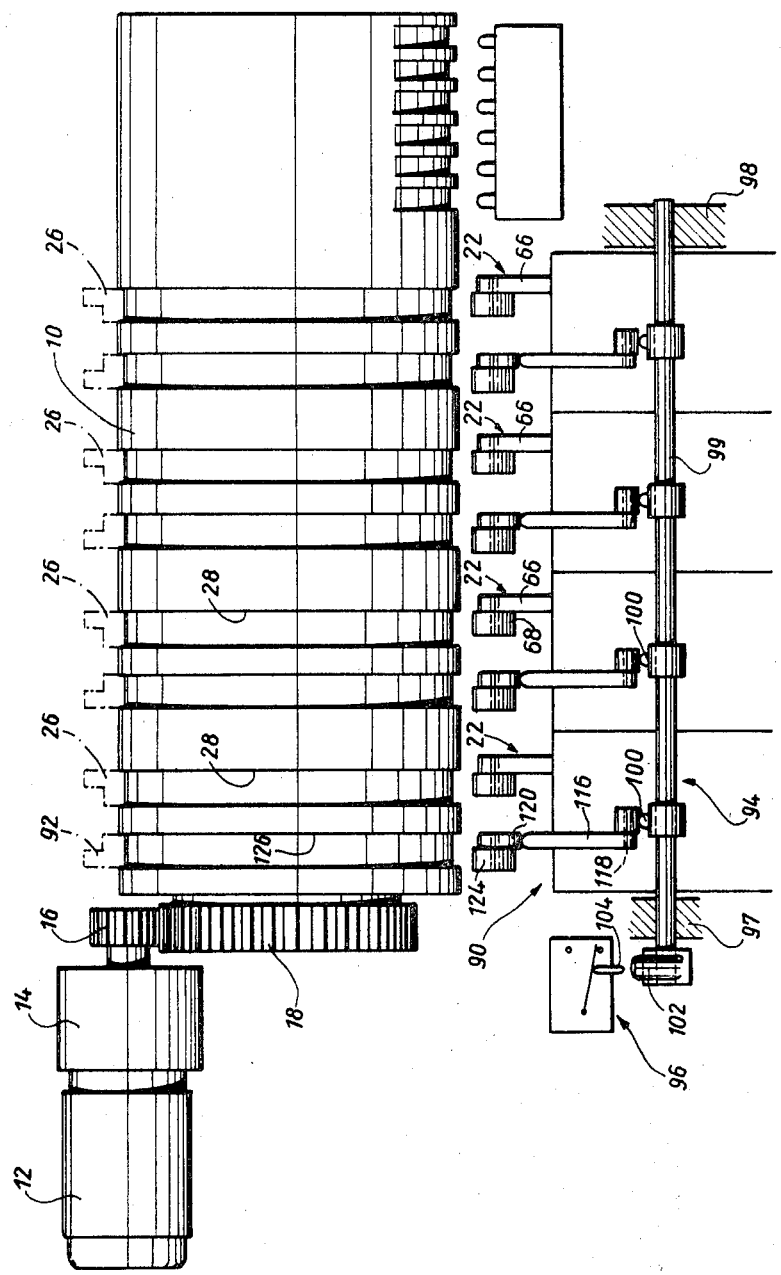
FIG. 2 is a side elevational view of the control arrangement as seen in the direction of arrow II in FIG. 1.

FIGS. 1 and 2 illustrate certain details of an automatic machine tool and a control arrangement which regulates the operation of plural feed mechanisms for a series of tool holders or slides 20. The control arrangement comprises a rotary camshaft 10 which is rotated by a drive including an electric motor 12, a variable-speed transmission 14, and reducing gears 16, 18. The function of the camshaft 10 is to regulate the flow of hydraulic fluid through four control valves 22, one for each of the four tool slides 20. These tool slides are reciprocable in the radial direction of a work holder or spindle 24 provided with a suitable chuck to hold and to rotate a workpiece, for example, a bar which is fed through the work spindle 24 and is treated by tools 19 in a predetermined sequence.

The camshaft 10 carries four control cams 26 each of which can actuate one of the control valves 22 in a predetermined angular position of the camshaft. Each control cam 26 is received in and is adjustable in a circumferential groove 28 of the camshaft 10 and can be fixed in selected position of adjustment by conventional fasteners, not shown.

The purpose of the control arrangement which includes the camshaft 10 and control valves 22 is to prevent collision or interference between the tools 19 or tool slides 20 during travel toward or away from engagement with the workpiece held by the work spindle 24. In the absence of such control arrangement, the timing of power traverse and feed movements of hydraulically operated tool slides could not be controlled with a requisite degree of accuracy. For example, when the hydraulic fluid is oil, it will flow slowly at lower temperatures so that the camshaft 10 could cause premature actuation of a control valve 22 whereby a tool slide 20 which is about to perform or is actually performing a return stroke might collide with a tool slide which is performing a forward traverse stroke or a feed stroke. This is likely to occur when the working station of the machine tool is crowded.

Each of the tool slides 20 is reciprocable by a feed mechanism 30 including a hydraulic cylinder and piston unit having a fixed cylinder 31 and a piston 33 which divides the interior of the cylinder into chambers 32, 34. The piston rod 33a of each piston 33 is connected to a bracket 20a of the respective tool slide 20. The chambers 32, 34 of the cylinder 31 are connected with conduits 36, 38 which can admit or evacuate hydraulic fluid, depending on the position of the valve member 62 in the housing 64 of the respective control valve 22. In order to effect a forward traverse and thereupon a feed stroke of the respective tool slide 20, a control valve 22 must admit hydraulic fluid into the conduit 38 and chamber 34. Such fluid flows through a fluid flow regulating or metering valve 40 which determines the exact speed of forward traverse and feed strokes. Each metering valve 40 is connected in parallel with a changeover valve 42 which is connected with the conduit 38 upstream of the valve 40 and with an end portion 44 of the conduit 38 downstream of the valve 40. The changeover valve 42 is actuatable by a trip 46 which is affixed to the bracket 20a of the respective tool slide 20. A one-way valve 50 is installed in a bypass conduit 48 which is connected with the conduit 38 upstream and downstream of the valve 40. This valve 58 permits evacuation of fluid from the chamber 34 during rapid return traverse of the respective tool slide 20. An adjustable stop screw 52 on the bracket 20a cooperates with the cylinder 31 to limit the feed stroke of the respective tool 19.

When a tool 19 reaches its foremost position and the stop screw 52 abuts against the corresponding cylinder 31, fluid pressure in the chamber 34 rises and is communicated through a conduit 60 connected with a reversing unit 54. The purpose of the reversing unit 54 is to actuate the respective control valve 22 so that the latter initiates a return stroke of the associated tool slide 20 by admitting hydraulic fluid through the conduit 36, i.e., into the chamber 32. Each reversing unit 54 comprises a fixed cylinder 56 and a piston 58 which is biased by a spring 59 to normally assume the retracted position shown in FIG. 1. Each conduit 60 is connected with the end portion 44 of the respective conduit 38. When a control valve 22 continues to admit fluid via conduit 38 after the stop screw 52 abuts against the cylinder 31, the fluid flows from the end portion 44 into the conduit 60 and cylinder 56 to displace the piston 58 against the opposition of the spring 59.

Each control valve 22 comprises the aforementioned valve member 62 which is reciprocable in the valve housing 64 substantially radially of the camshaft 10, and each control valve further comprises an impeller 66 which is reciprocable in the valve housing 64 in parallelism with the valve member 62. The impeller 66 is movable between two end positions in one of which it causes the valve member 62 to assume a first end position and to admit fluid into the conduit 38. In its other end position which is shown in FIG. 1, the impeller 66 causes the associated valve member 62 to admit fluid into the conduit 36. The arrangement is such that the valve member 62 is caused to snap or jump from the one to the other end position, or vice versa, and is releasably held in each of its end positions. The impeller 66 has two arms 66a which extend across the end faces of the respective valve member 62 and carry shifter pins 70, 72 biased by springs 88. The impeller 66 also carries a roller follower 68 which is movable by unit 54 into the path of the respective control cam 26 on the camshaft 10 and can displace the impeller downwardly, as viewed in FIG. 1, whereby the shifter pin 72 causes the valve member 62 to snap from the end position shown in FIG. 1 to the other end position in which the conduit 38 receives fluid from a pump 199 installed in a pressure line 200 connecting the valve housing 64 with an oil tank 201. The housing 64 is further connected with two return lines 202, 203 which can receive fluid from the conduits 36, 38.

The detent means for yieldably holding the valve member 62 in its end positions comprises two locking bolts 74, 76 which are reciprocable in the housing 64 and are biased by springs 78. The tips of these locking bolts can enter notches 80, 82 provided in the peripheral surface of the valve member 62. The means for disengaging the locking bolts 74, 76 from the valve member 62 comprises two rollers 84, each provided on one of the locking bolts, and two cam faces 86 on the impeller 66. When the impeller 66 of FIG. 1 moves downwardly in response to engagement of a control cam 26 with the roller follower 68, the upper spring 78 is free to expand and to move the locking bolt 74 into the notch 80 to lock the valve member 62 in the lower end position. At the same time, the lower cam face 86 moves the adjoining disengaging roller 84 against the opposition of the lower spring 78 to withdraw the locking bolt 76 from the notch 82. Such downward movement of the impeller 66 causes the upper shifter pin 72 to bear against the upper end face of the valve member 62 and the latter moves abruptly to its lower end position as soon as the locking bolt 76 is withdrawn from the notch 82. Such abrupt movement takes place when the upper spring 88 stores at least some energy in response to relative movement between the upper impeller arm 66a and shifter pin 72. The impeller 66 will return to the position shown in FIG. 1 when the cylinder 56 of the reversing unit 54 receives fluid through conduit 60 and its piston 58 overcomes the opposition of the spring 59.

In accordance with an important feature of the present invention, the control arrangement comprises an arresting assembly which arrests the drive 12–18 for the camshaft 10 until a tool 19 completes its feed stroke and moves back to its retracted position so that it cannot interfere with forward traverse and feed strokes of the next tool 19. This arresting assembly includes an actuating device here shown as an electric switch 96 in the circuit of the motor 12. The switch 96 opens in response to motion received from one of four second or auxiliary cams 92 provided on the camshaft 10. In the embodiment of FIGS. 1 and 2, each control valve 22 can actuate a motion transmitting unit 90 which comprises a link train, and each such unit 90 is also actuatable by one of the cams 92. In order to simplify the construction of the arresting assembly, the four motion transmitting units 90 are coupled with a single tripping device 94 which can displace the movable contact 104 of the switch 96. The tripping device 94 comprises a shaft 99 which is rotatable in stationary bearings 97, 98 and carries four one-armed levers 100 each adapted to receive motion from one of the motion transmitting units 90. The shaft 99 is further rigidly connected with an arm 102 biased by a return spring 106 which tends to maintain it in the idle position shown in FIG. 1 in which the arm 102 abuts against a fixed stop 108 and the switch 96 is closed.

Each lever 100 has a head 112 constituting a fulcrum for one of four balance beams 110 which form part of the units 90 and are mounted on pivot pins 118 carried by reciprocable pushers 116. The balance beams 110 can rock the levers 100 in a clockwise direction, as viewed in FIG. 1, when the corresponding locking bolts 74 extend into the notches 80 and the pushers 116 are depressed by levers 120 which are rockable by cams 92. Each balance beam 110 is tiltable on the respective fulcrum 112 and one of its end portions is movable by a flange 114 of the corresponding valve member 62. The other end portion of each balance beam 110 is articulately connected with the corresponding pivot pin 118. The pushers 116 are parallel to the valve members 62. The levers 120 are pivoted to the machine frame F by pins 122 and carry roller followers 124 each of which can be moved into the path of movement of one of the cams 92. FIG. 2 shows that the camshaft 10 is provided with four additional circumferential grooves 126 each of which accommodates one of the cams 92. As a rule, each groove 126 will be closely or immediately adjacent to the corresponding groove 28.

The operation is as follows:

The motor 12 is started in response to closing of a master switch (not shown) whereby the camshaft 10 begins to rotate in a counterclockwise direction, as viewed in FIG. 1, and one of its control cams 26 engages the associated roller follower 68 to move the impeller 66 downwardly against the opposition of the lower spring 78. The upper shifter pin 72 compresses the corresponding spring 88 and the lower cam face 86 moves the locking bolt 76 away from the notch 82 so that the upper spring 88 expands and the upper pin 72 propels the valve member 62 to the lower end position in which the pressure line 200 admits fluid into the conduit 38. At the same time, the valve member 62 seals the conduit 36 from the pressure line 200 and connects it with the return line 202 so that fluid is free to flow from the chamber 32 and back to the tank 201. Fluid flows from the tank 201, through the pressure line 200, conduit 38, metering valve 40, end portion 44 of the conduit 38, and into the cylinder chamber 34 whereby the corresponding tool slide 20 starts its forward traverse stroke followed by a feed stroke during which the tool 19 removes material from the workpiece which revolves with the chuck of the work spindle 24.

When the valve member 62 snaps to its lower end position, as viewed in FIG. 1, its shoulder 114 tilts the balance beam 110 in a clockwise direction whereby the beam pivots on the fulcrum 112 and causes the pivot pin 118 to move the pusher 116 upwardly and to pivot the lever 120 in a counterclockwise direction. The lever 120 then places its roller follower 124 into the path of movement of the corresponding cam 92. Since the cam 92 trails the associated control cam 26, the position of the lever 100 remains unchanged because the arm 102 of the shaft 99 is biased by the return spring 106 which maintains the arm 102 in abutment with the stop 108. The bias of the spring 106 is strong enough to compensate for minimal friction between the pusher 116 and its ways in the frame F. It can be said that the shoulder 114 of the valve member 62 cocks the balance beam 110 so that the latter is ready to effect opening of the switch 96 as soon as the roller follower 124 is engaged by the associated cam 92. Such engagement between the roller follower 124 and cam 92 causes the lever 120 of the corresponding motion transmitting unit 90 to pivot in a clockwise direction, as viewed in FIG. 1, and to move the pusher 116 downwardly whereby the pusher tilts the balance beam 110 in a counterclockwise direction against the opposition of the return spring 106. The balance beam 110 pivots the associated lever 100 in a clockwise direction and the lever 100 turns the shaft 99 and arm 102 so that the latter displaces the contact 104 and opens the switch 96. The motor 12 is arrested and the camshaft 10 comes to a halt in an angular position in which the next-following control cam 26 is located ahead of the corresponding roller follower 68.

The pump 199 continues to deliver fluid through the pressure line 200 and conduit 38 whereby such fluid flows into the chamber 34 and causes the tool slide 20 to move toward the axis of the work spindle 24. The feed stroke of the tool 19 is terminated when the stop screw 52 abuts against the cylinder 31 of the corresponding feed mechanism 30. It will be seen that the tool slide 20 is free to continue its forward traverse and feed strokes irrespective of the condition of the motor 12, i.e., regardless of whether or not the camshaft 10 is at a standstill, as long as the valve member 62 remains in its lower end position (as viewed in FIG. 1). When the stop screw 52 abuts against the cylinder 31 and the pump 199 continues to supply fluid into the conduit 38, such fluid begins to flow into the conduit 60 and chamber of the cylinder 56 in the associated reversing unit 54. The piston 58 moves upwardly to compress the spring 59 and to displace the impeller 66 against the opposition of the upper spring 78. The lower arm 66a of the impeller 66 moves the lower shifter pin 70 against the lower end face of the valve member 62 to compress the lower spring 88 and to abruptly shift the valve member 62 to the upper end position which is actually shown in FIG. 1, as soon as the upper locking bolt 74 is withdrawn from the notch 80. The pressure line 200 is then connected with the conduit 36 and the conduit 38 is connected with the return line 203. The return line 202 is sealed from the conduit 36 so that the latter admits fluid into the chamber 32 and causes the associated tool slide 20 to perform a return traverse stroke. The one-way valve 50 permits rapid evacuation of fluid from the cylinder chamber 34 so that the return stroke requires little time.

The spring 106 is free to expand as soon as the valve member 62 returns to the position of FIG. 1 because the shoulder 114 moves upwardly and enables the balance beam 110 to pivot about the pin 118. The lever 120 remains in its lower end position because the roller follower 124 is engaged by the corresponding cam 92. The spring 106 causes the arm 102 of the shaft 99 to release the movable contact 104 whereby the switch 96 closes and the motor 12 is started to rotate the camshaft 10 and to move the next-following control cam 26 into engagement with the roller follower 68 of the corresponding impeller 66. The motor 12 is started despite the fact that, at the moment of starting, cam 92 actually engages the corresponding follower 124. The camshaft 10 will cease to rotate when the next-following cam 92 engages the roller follower 124 on the corresponding lever 120 and causes the arm 102 to open the switch 96.

The cams 26 and 92 are staggered in the circumferential direction of the camshaft 10 in such a way that a tool slide 20 has ample time to move away from the working station before the next tool slide 20 begins its forward traverse stroke. It is not necessary to select the angular positions of control cams 26 with utmost accuracy because a clashing of tool slides 20 at the working station is avoided if the control cams 26 are separated from each other by cams 92, as seen in the circumferential direction of the camshaft 10. This insures that the camshaft 10 comes to a halt and remains stationary until a tool slide 20 which has been moved to its forward position begins to move away from the working station. The cams 92 are preferably mounted immediately behind the corresponding control cams 26 so that the camshaft 10 is arrested as soon as a valve member 62 assumes the end position in which the conduit 38 communicates with the pressure line 200. If the angular distance between successive control cams 26 is small, the tool slides 20 will be moved toward the work spindle 24 in rapid succession because the cams 26 will actuate the respective valves 22 with minimal delay following starting of the motor 12.

If desired the control arrangement may comprise four serially connected switches 96 and the shaft 99 then carries four arms 102 each of which is rigid with one of the levers 100. The levers 120 can be omitted if the followers 124 are mounted directly on or form part of the pushers 116. Thus, the cams 92 can move the pushers 116 directly or indirectly through the levers 120.

FIG. 3 illustrates a portion of a modified control arrangement. All such parts which are clearly analogous to those shown in FIGS. 1 and 2 are denoted by similar reference numerals. The valve member 132 of the control valve 22' shown in FIG. 3 is provided with an integral impeller 130 having a roller follower 134 which is engageable by the corresponding control cam 26 of the camshaft 10. The housing 136 of the valve 22' carries a simplified detent structure having a locking bolt 140 biased by a spring 138 and provided with a pointed end portion which can enter the notch 142 or 144 of the valve member 132. The notches 142, 144 are adjacent to each other.

The reversing unit 54 acts directly against the lower or outer end face of the valve member 132.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. A control arrangement, particularly for regulating the operation of plural hydraulic feed mechanisms in automatic machine tools comprising a camshaft provided with a plurality of circumferentially staggered control cams; drive means operative to rotate said camshaft; a plurality of control valves each actuatable by one of said control cams to move from a first to a second position; reversing units for returning said control valves to first positions with a delay following movement to second position responsive to such movement to said second position; and arresting means for interrupting the operation of said drive means responsive to movement of a control valve to second position so that said camshaft is brought to a standstill whenever a control valve leaves its first position, said arresting means being further responsive to movement of said control valve back to the first position by its reversing unit to re-start said drive means.

2. A control arrangement as defined in claim 1, wherein said arresting means comprises second cams provided on said camshaft and alternating with said control cams, actuating means operatively connected with said drive means and movable between first and second positions respectively corresponding to idle and operative conditions of said drive means, and separate motion transmitting means for each of said control valves and each arranged to move said actuating means to first position in response to engagement with one of said second cams.

3. A control arrangement as defined in claim 2, wherein said arresting means further comprises tripping means providing an operative connection between said actuating means and said motion transmitting means.

4. A control arrangement as defined in claim 3, wherein each of said motion transmitting means comprises a follower movable into the path of movement of the respective second cam in response to movement of the corresponding control valve to second position so that such follower can be engaged by the respective second cam on rotation of said camshaft following movement of the associated control cam beyond said corresponding control valve.

5. A control arrangement as defined in claim 4, wherein each of said motion transmitting means further comprises a link train including a first member operatively connected with the respective follower, a second member cooperating with said first member and the respective control valve, and a third member cooperating with said second member and said tripping means.

6. A control arrangement as defined in claim 5, wherein said tripping means is arranged to move said actuating means to first position upon movement of the respective control valve to second position and in response to engagement of the respective follower by the associated second cam.

7. A control arrangement as defined in claim 6, wherein said tripping means comprises a shaft and an arm connected to said shaft, said third members being fixed to said shaft and said second members being constituted by balance beams fulcrumed on the respective third members.

8. A control arrangement as defined in claim 7, wherein said drive means comprises an electric prime mover and said actuating means comprises an electric switch connected in the circuit of said prime mover, said first and second positions of said actuating means respectively corresponding to open and closed positions of said switch and said arm being arranged to open said switch in response to pivoting of one of said third members by the respective balance beam on displacement of the respective follower by the associated second cam and while the respective control valve assumes said second position.

9. A control arrangement as defined in claim 7, wherein each of said control valves comprises a portion arranged to tilt the respective balance beam and to thereby effect movement of the respective follower into the path of the associated second cam on movement of the control valve to second position.

10. A control arrangement as defined in claim 8, wherein each of said first members comprises a reciprocable pusher pivotably connected with the respective balance beam to move the respective follower into the path of movement of the associated second cam in response to tilting of the respective balance beam by the respective third member and to pivot such third member to thereby open said switch in response to displacement of the corresponding follower by the associated second cam.

11. A control arrangement as defined in claim 10, wherein each first member further comprises a lever connected with the respective follower and pivotable in a first direction in response to displacement of the follower by the associated second cam to displace said pusher, said lever being pivotable in a second direction in response to displacement of the pusher by the respective balance beam to return the follower into said path of movement.

12. A control arrangement as defined in claim 3, wherein said drive means comprises an electric motor and said actuating means comprises a single electric switch connected in the circuit of said motor, said first and second positions of said actuating means respectively corresponding to open and closed positions of said switch.

13. A control arrangement as defined in claim 12, wherein said tripping means comprises a shaft provided with an arm arranged to open said single switch in response to rotation in a predetermined direction, each of said motion transmitting means comprising a lever affixed to said shaft and arranged to rotate the arm in said direction on movement of the respective control valve to second position and in response to engagement of the associated second cam with the respective motion transmitting means.

14. A control arrangement as defined in claim 13, wherein the shaft of said tripping means is parallel with said camshaft.

15. A control arrangement as defined in claim 1, wherein each control valve comprises a housing, a valve member reciprocable in the respective housing between said first and second positions, and an impeller cooperating with the respective control cam to move the valve member to second position and with the respective reversing unit to move the valve member to first position.

16. A control arrangement as defined in claim 15, wherein each impeller comprises means for propelling the respective valve member from one of said positions to the other position.

17. A control arrangement as defined in claim 1, wherein each of said control valves comprises a housing, a valve member reciprocable in the respective housing between first and second positions, and follower means extending into the path of the respective control cam in the first position of the valve member to effect movement of such valve member to second position in response to displacement by the control cam.

18. A control arrangement as defined in claim 17, further comprising detent means for yieldably holding the valve members in said first and second positions.

References Cited

UNITED STATES PATENTS

| 1,868,801 | 7/1932 | Munz | 137—624.17 |
| 2,903,058 | 9/1959 | Larison | 137—624.2 |
| 2,946,346 | 7/1960 | Mead | 137—624.17 X |

ALAN COHAN, *Primary Examiner.*

U.S. Cl. X.R.

91—318, 219